G. R. OSBORN & B. A. DRAYTON.
FEED-CUPS FOR BIRD-CAGES.
No. 171,309.
Patented Dec. 21, 1875.
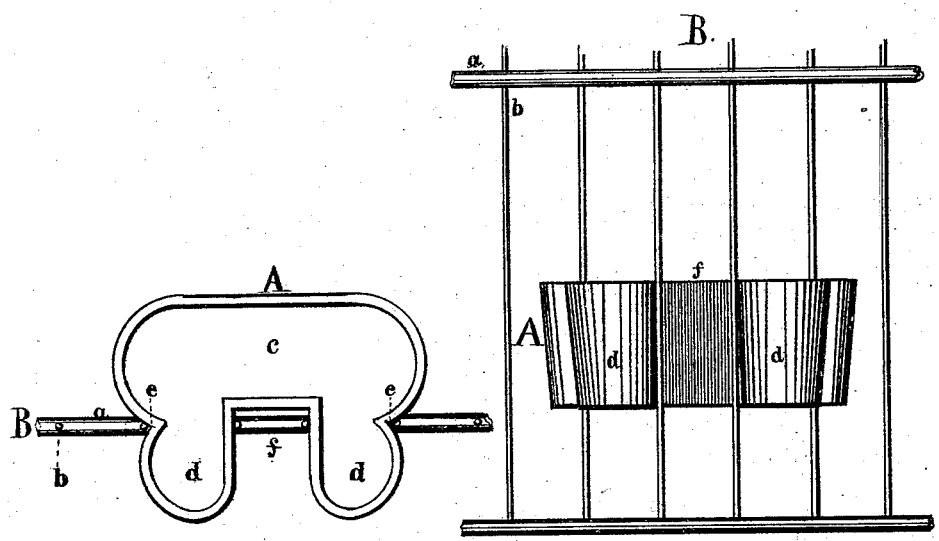
Witnesses.
Harry W. Lawrence
Leslie R. Quackenbush
Inventors.
George R. Osborn,
Benj' A. Drayton.

UNITED STATES PATENT OFFICE.

GEORGE R. OSBORN, OF EAST ORANGE, NEW JERSEY, AND BENJAMIN A. DRAYTON, OF NEW YORK, N. Y.

IMPROVEMENT IN FEED-CUPS FOR BIRD-CAGES.

Specification forming part of Letters Patent No. 171,309, dated December 21, 1875; application filed October 13, 1875.

CASE B.

*To all whom it may concern:*

Be it known that we, GEORGE R. OSBORN, of East Orange, Essex county, State of New Jersey, and BENJ. A. DRAYTON, of the city and State of New York, have jointly invented certain Improvements in Bird-Cage Feed-Cups, of which the following is a specification:

The object of the invention is to produce a feed and water cup for bird-cages which may be inserted between the filling-wires of a cage without special provision of place, and by virtue of its peculiar form retained by the pressure of the filling-wires to certain parts of the cup.

We make such changes in form from any cup of its class as to insure firmer holding than any heretofore made. It also presents more surface accessible to the bird to feed from than most cups of its class. These designs carried out afford an economical and effective feeding apparatus for the cheaper grades of cages.

In the drawing, Figure 1 shows a top view, and Fig. 2 a front view, of the cup A, in a section of a cage, B.

*a* indicates the frame-work, and *b* the filling-wires, of the cage; *c*, the body or reservoir of the cup; *d d*, two spouts projecting from the front, so far removed from each other as to allow two upright or filling wires to pass through the recess. This gives the retaining-power of four wires instead of two, as in other constructions. It is less liable to tip, having so wide a setting, than fountain-cups, which have so narrow a holding as one space in the filling-wires. It presents more surface for the bird to feed from. It may be placed on the outside or inside of the cage at any point in the filling-wires without cutting, bending, or any other preparation. *e e* show a notch or depression in the sides of the cup, which is a common device in the class of cups where the filling-wires of the cage act as retaining-springs; hence we do not claim as new and of our invention the fact simply of recesses or notches in the sides of our cup for the better clasping of the same, nor do we claim the quality simply of retention by spring-pressure between the filling-wires of the cage, as the old style of fountain-cup and other well-known and long-used feed-cups have these qualities and devices; neither do we claim the combination of reservoir and feed-spout, as that is also old.

We claim as new, and of our invention—

A feed-cup, having two feed-spouts projecting from the body of the cup, and formed to insert and be securely retained between the upright wires of the cage, as shown and specified.

GEORGE R. OSBORN.
BENJ. A. DRAYTON.

Witnesses:
HARRY W. LAWRENCE,
LESLIE R. QUACKENBUSH.